Feb. 7, 1928. 1,658,457
E. MOLDENKE
APPARATUS FOR TREATING ALUMINOUS MATERIALS
Original Filed Sept. 28, 1920
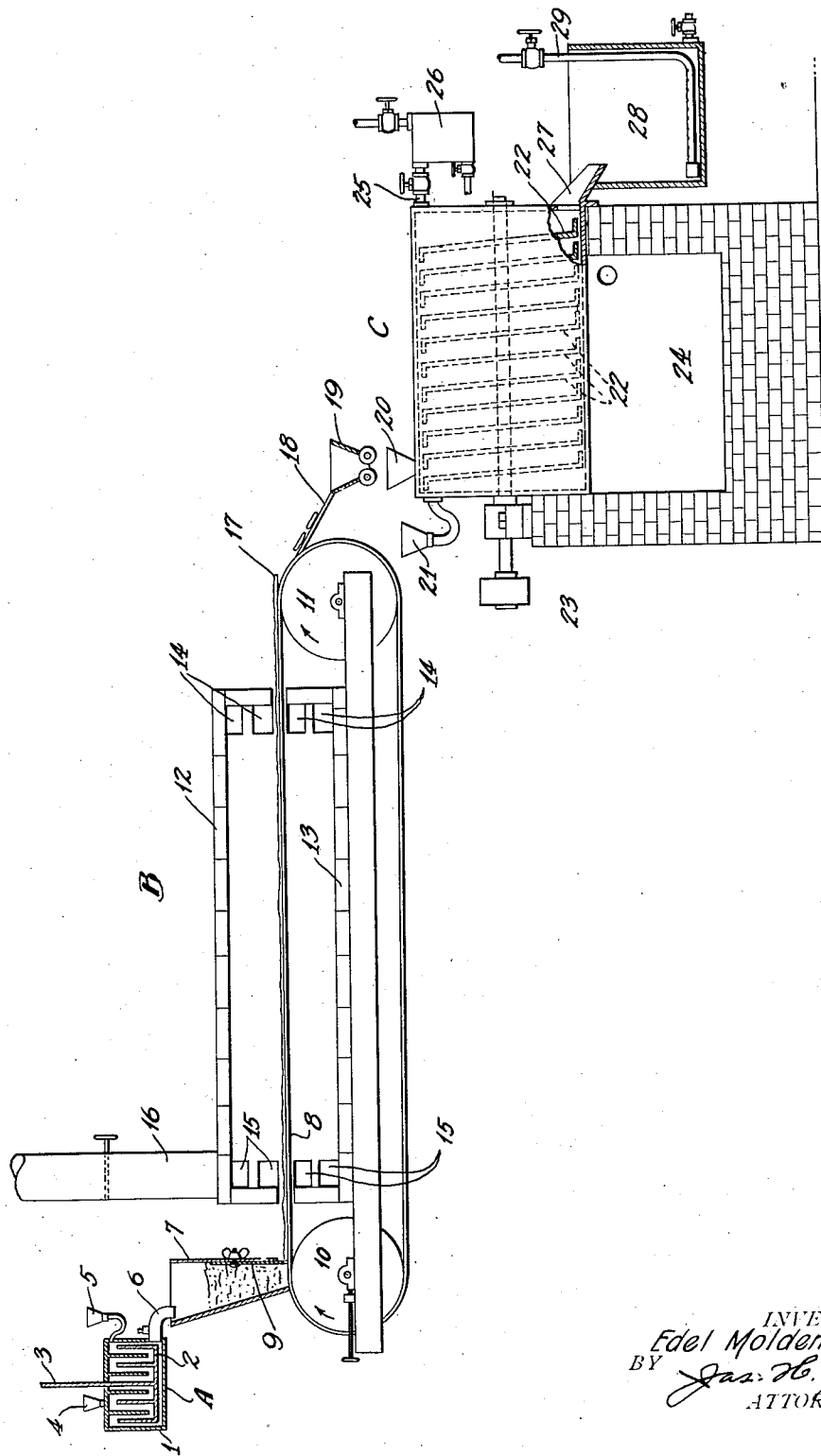
INVENTOR.
Edel Moldenke
BY Jas. H. Griffin
ATTORNEYS.

Patented Feb. 7, 1928.

1,658,457

UNITED STATES PATENT OFFICE.

EDEL MOLDENKE, OF HARRISONBURG, VIRGINIA, ASSIGNOR TO MOLDENKE PROCESS CORPORATION, OF WATCHUNG, NEW JERSEY.

APPARATUS FOR TREATING ALUMINOUS MATERIALS.

Original application filed September 28, 1920, Serial No. 413,402. Divided and this application filed April 27, 1923. Serial No. 635,151.

This application is a division of application Serial No. 413,402, filed September 28, 1920, Patent No. 1,457,787.

The invention relates to processes of treating aluminous materials; and it comprises a process of treating hard-baking or hard setting materials, more particularly applicable in methods of roasting aluminous materials with sulfuric acid, wherein such hard baking or setting material is heated in contact with or on a flexible surface during the hardening period, being thereafter stripped therefrom by curving such surface, said material being in a layer sufficiently thick to have, after the hardening and at the time of stripping, enough mechanical strength to peel off in fragments at the time of curvature; as in a method wherein a layer of a pasty mixture of sulfuric acid and aluminous material (such as bauxite, clay, alunite, etc.) is slowly conveyed through a heated chamber during the period in which a tendency to stick and cake develops, conveyance being on a belt of strong and smooth material, such as sheet steel or iron and the layer being of substantial thickness, the layer broken off by curving the belt, the fragmentary hard material comminuted and finally roasted in the usual ways; all as more fully hereinafter set forth and as claimed.

In various methods of treating various chemical materials and mixtures by heat in metal pans or vessels, there is a development of stickiness and hardness during the first stages of heating; the materials tend to "bake on" the pan. Usually this tendency is resisted by the use of powerful stirring or cutting devices which keep the mass comminuted. It is however often difficult to find structural materials resistant to chemical actions at high temperatures and of sufficient strength to exert the power required; and in any event, it is usually impossible to keep all the surfaces of the pan clean and free from baked-on accumulations. In many cases, this necessitates frequent stoppage and cooling to permit cleaning. These difficulties are particularly noticeable in methods of roasting various aluminous materials (clay, bauxite, alunite, etc.) with sulfuric acid, in regard to which I shall more particularly describe the present invention. It is however applicable in many other cases, as in dehydrating such salts as crystallized sodium sulfate, alum, etc., which first melt in their water of crystallization and then bake hard.

In the present invention, I segregate the heating operation into different stages and perform the first, or that during which baking on occurs, on a thin smooth flexible member; the material being heated as a layer of substantial thickness. In most cases I use thin metal. The layer should be thick enough so that when hardening is effected, the layer should have substantial inherent strength of its own so that on curving the metal member the layer does not merely crack and follow the curvature but breaks off or peels away in fragments. Having so heated the material, the holder is curved, the fragments collected and (usually) comminuted and the heating completed in appropriate apparatus. In the second or final heating agitation is often not necessary and in any event does not require the usual powerful agitating and cutting or breaking means.

As stated, I shall more particularly describe the present invention in relation to the treatment of aluminous materials with sulfuric acid, but without limiting its application thereto. In various current methods of treating clay, bauxite or alunite with sulfuric acid, the finely ground material is mixed with sulfuric acid and the mixture heated or roasted in a pan or drum provided with powerful agitating means. The mixture is at first a sort of paste or mud, like any other intimate mixture of a fine-grained solid and a liquid, but as chemical reactions go on it becomes sticky and stiff and finally hard, forming a dry caked mass which is again comminuted by the agitating means to give a dry granulated body of material. Much power is required and high temperatures are often attained—300° to 400° C. and higher. With the apparatus ordinarily used, much trouble is experienced in the mixture sticking to the pan and baking on; and it is usually necessary in these operations to stop periodically and clean up, thereby losing time and labor. Baked-on accumulations frequently are so hard as to require removal with hammer and chisel.

In the present invention I first heat the initial mixture until it has passed through the pasty and sticky stages and becomes hard and caked, this heating being performed on a flexible or bendable member of some kind. This member is best a sheet iron or steel belt traveling through a hot chamber and passing over rolls or pulleys of relatively large diameter. I then comminute the caked mass dropping or peeling off the belt and finish by heating elsewhere. A layer of the paste of acid and solid material is carried through a chamber which may be internally or externally heated as may be convenient. The final temperature of the material passing through it is made as high as may be necessary to produce a hard and caked mass without substantial loss of sulfuric acid by volatilization. A layer of the paste fed on such a belt traveling slowly through such a hot chamber of such a length and such a temperature as to dry and cake the mass at a point just prior to the exit of the belt from the heating chamber if of sufficient thickness will be automatically stripped off and fall from the belt as the belt changes its curvature in going around the pulleys or rollers. If thinner, the layer may simply crack and follow the belt, from which it is then hard to detach it. As noted, these masses are sometimes so hard and adhere so tightly to iron and steel as require hammer and chisel for detachment, coming off chip by chip. However, with a smooth-surfaced metal belt and a sufficiently hard and strong layer, the hardness and strength themselves cause stripping in the described way, and the caked mass tumbles off in a hard fragmentary condition. It may then be easily ground and comminuted. As grinding need not be at any high temperature, any convenient usual type of breaking or grinding machinery, such as rolls, may be used. The dry or semi-dry granular material so produced may then be finished in the usual pans or drums.

The present process is particularly useful in connection with the process of Richard Moldenke of utilizing alunite, Patent No. 1,282,273, October 22, 1918. In this process finely comminuted alunite is heated in a closed vessel with concentrated sulfuric acid in sufficient amount to form a mass which is initially pasty. Digestion is at a temperature sufficient to cause a free evolution of fumes; these fumes however not being permitted to escape. After this operation the valuables of the material become soluble in water and can be recovered. In utilizing the present invention with such a process as that of said Richard Moldenke, instead of directly delivering the pasty mixture of acid and alunite into the treatment vessel or roaster, this mixture is first passed through a heated chamber on a flexible conveyer, such as a belt, until it is converted into a hard, caked and non-sticky form, is flaked off as described and is then comminuted, and the comminuted material heated and further treated in the manner described by said Richard Moldenke.

In the accompanying illustration I have shown, more or less diagrammatically, an organization of apparatus elements suitable for use in performing the present process.

In this showing, which is in longitudinal vertical section, certain parts being shown in elevation, element A is a mixer consisting of a casing 1, having revoluble breaking arms 2 therein actuated by shaft 3. Pulverized alunite, clay or bauxite is supplied to this device by hopper 4, while acid is added at 5. The aluminous material and the acid are mixed to a paste in this device. The paste is discharged through gated outlet 6 into a feeding device 7. This feeding device is positioned immediately above a belt or the like 8 which, for the present purposes, may be made of light sheet iron and feeds a layer of the pasty mixture thereon, the thickness being adjusted by gate 9. As shown, the conveyor passes over two pulleys or wheels 10 and 11 and through a roasting or drying chamber B. This chamber is provided with roof 12, floor 13, and receives hot products of combustion or other heating medium through a number of ports 14 above and below the part of the conveyor going through the chamber. Waste gases are discharged through ports 15 and reach dampered chimney or stack 16. The return of the belt as shown is underneath the floor of the roasting chamber. The depth of the layer, the length of the chamber and the speed of passage of the belt are so adjusted that the pasty mixture supplied on the belt is hard and caked by the time it reaches the end of the chamber. The temperature of the chamber is carried as high as is practical without loss of sulfuric acid. The hard, caked material on the belt is torn from it and breaks off as the belt changes curvature in going around the pulley 11. The caked material 17 passes down a slide 18 into diagrammatically shown grinding device 19, where it is broken and comminuted. The end of the slide 18 may serve as a doctor to clean the belt of any adhering loose material. From the grinding means the material goes into hopper 20 on an apparatus C of the general type of that shown by said Richard Moldenke, Patent No. 1,282,273.

If not enough acid has been added in the first place, or if conditions in the drying chamber have been improper with resultant loss of acid by volatilization and escape, more acid may be here added at 21. Such an addition of acid is not usually desirable, since it may lead to the material sticking and caking again, but this secondary caking is not usually serious. The comminuted material is agitated within this device by arms 22 kept in rotation by pulley 23. Heat is imparted to the drum by furnace chamber 24. In roasting in this chamber, more or less sulfuric acid ($SO_3$ and $H_2SO_4$) volatilizes but this is not permitted to escape. The only vent is at 25 communicating with trap 26 which may contain a little sulfuric acid as a collecting means. Roasted material is delivered by chute 27 into tank 28. As shown, this is adapted to the treatment of roasted alunite and is provided with steam pipe 29 for leading in open steam to agitate the mixture of roasted material and water.

A sheet iron belt passing over pulleys or rollers of large diameter is the most convenient form of apparatus for the present purposes, but of course any other flexible member with means for changing its curvature may be used, such as a drum with a flexible surface. The main point is to make a cake of sufficient thickness, hardness and strength to resist deformation or minute disintegration and then peel it off by deforming the carrying surface. In so deforming the carrying surface, compression, tension and shearing strains are set up in the cake by the adhesion of cake and surface. For the present purposes, it is necessary to have sufficient thickness of the cake to give it strength to resist, for the most part, these various stresses tending to its disintegration so that when the carrier curves it will not do so but will tend to continue on it the original path.

The apparatus shown and described may be used for many other purposes than hot-treating alunite with sulfuric acid; it being also useful for the like purpose of hot-treating clay or bauxite in the manufacture of sulfate of alumia (aluminum sulfate); for the dehydration of sodium sulfate, alum, etc. Sodium sulfate when heated melts in its water of crystallization and then becomes a hard frothy mass which is difficult to dry completely in any technical apparatus. If fed on the belt and heated in the manner shown, it is converted into a cake which may be comminuted and then dried in any apparatus, such as that shown at C. Such a flexible abruptly curved member may also be used in other relations where heating is not involved but cakes are formed, as for instance, in making ice, a layer of ice being first made and then peeled off in fragments.

Having thus fully described the invention, what I claim as new and desire to secure by Letters Patent is:

1. Apparatus of the character described embodying a flexible carrier, means for mixing finely divided aluminous material and sulphuric acid and adapted for depositing the resulting paste in the form of a layer on the carrier, means adapted for heating said layer, while on the carrier, to cake the paste, means for flexing the carrier to free the cake therefrom, grinding mechanism adapted to receive the cake discharged from the carrier and to comminute it, and means adapted to heat the thus comminuted cake.

2. Apparatus of the character described embodying an endless flexible belt mounted to travel, a hopper positioned to deposit finely divided aluminous material and an acid in the form of a paste upon the belt, means for heating the paste while on the belt to effect caking thereof, and rollers about which the belt is mounted to travel, whereby the caked substance is caused to break and fall free from the belt while passing about one of the rollers, in combination with means to receive the broken cake from the belt and to grind it, and roasting means.

3. Apparatus of the character described embodying a flexible belt mounted to travel over rollers spaced apart, means adapted for delivering a paste of aluminous material and sulphuric acid upon the belt adjacent one roller to be carried along by the belt toward the other roller, means adapted to heat the material at a sufficient temperature to cake it before it reaches the latter roller, whereby the cake will be sufficiently hard to be freed from the belt as it passes over said latter roller, grinding mechanism for receiving the cake thus discharged from the belt and for grinding, and roasting mechanism for receiving the ground material from the grinding mechanism and adapted for heating it to a sufficient temperature.

In testimony whereof, I have signed the foregoing specification.

EDEL MOLDENKE.